(12) United States Patent
Adar et al.

(10) Patent No.: US 6,470,269 B1
(45) Date of Patent: Oct. 22, 2002

(54) METHOD FOR PROVIDING TIME DISCRIMINATION IN THE WORLD WIDE WEB

(75) Inventors: Eytan Adar, Foster City, CA (US); Bernardo A. Huberman, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/377,697

(22) Filed: Aug. 20, 1999

(51) Int. Cl.[7] .............................................. G06F 15/16
(52) U.S. Cl. ....................................................... 701/219
(58) Field of Search ................................ 709/219, 203; 707/501

(56) References Cited

U.S. PATENT DOCUMENTS

| | | | |
|---|---|---|---|
| 5,832,229 A | * 11/1998 | Tomoda et al. | 709/227 |
| 5,845,078 A | * 12/1998 | Tezuka et al. | 709/222 |
| 5,848,396 A | 12/1998 | Gerace | 705/10 |
| 5,870,552 A | 2/1999 | Dozier et al. | 395/200.49 |

OTHER PUBLICATIONS

Hal R. Varian, "Versioning Information Goods", University of California, Berkley, Mar. 13, 1997.

* cited by examiner

*Primary Examiner*—David Y. Eng
(74) *Attorney, Agent, or Firm*—Finnegan, Henderson, Farabow, Garrett & Dunner, LLP

(57) ABSTRACT

A method for providing time discrimination in the World Wide Web. The method includes the steps of creating a computational model of users of the World Wide Web that represents aggregate World Wide Web surfing patterns; using the computational model to determine a first number of clicks that an user goes through in a specific type of query entered by the user in a conventional web search engine; using the computational model to determine a second number of clicks that the user goes through in the specific type of query entered by the user in an optimized web search engine; and subtracting the first number of clicks from the second number of clicks to extract the gain obtained by time discrimination.

19 Claims, 14 Drawing Sheets

Best air fare to major citties

San Francisco _____
New York _____
Seattle _____

To enter year
destination press here ☐

Departure:_____

Destination:_____

Dates:_____

Press here for
cheapest rate ☐

METHOD FOR PROVIDING TIME DISCRIMINATION IN THE WORLD WIDE WEB

BACKGROUND OF THE INVENTION

A. Field of the Invention

The present invention relates generally to publishing hypermedia documents over wide area networks such as the World Wide Web. More particularly, this invention relates to the application of the price discrimination technique in the area of economics to the publishing of hypermedia documents containing advertising materials.

B. Description of the Related Art

Wide area networks (WANs), notably the Internet, are assuming the role of "information superhighways" and are distributing electronic embodiments of mail, textbooks, magazines, advertisements, and even audio and video clips around the world. Herein the term "document" generically denotes and includes any and all such electronic content.

FIG. 1 conceptually illustrates the basic architecture of a "client-server" WAN, like the Internet. Servers 10$a$–$n$ form the backbone of the WAN. The servers are interconnected by a telecommunications infrastructure and exchange information in the form of one or more recognized protocols, such as protocol 30. For example, in the case of the Internet, network protocols include the File Transfer Protocol (FTP), for file transfer, and Telnet, for remote log-in. Each server effectively represents and services its one or more "clients". Basically, the clients are the ultimate sources and targets of underlying information, while the servers dispatch and receive messages across the WAN in compliance with network protocols. Each client may correspond to a single user's computer, or may itself be hierarchically complex and may comprise a further sub-network or collection of numerous computers, such as the well-known, proprietary sub-networks of America Online, Compuserve, and Prodigy. In this way, information of any kind can be distributed worldwide in electronic form at high speeds.

One of the most rapidly expanding aspects of the Internet is the World Wide Web (the Web). The Web is comprised of those Internet servers (and their clients) able to support the Hyper-Text Transfer Protocol, better known as the "http". The Web allows documents and graphical materials to be interlinked by means of "hypertext" (or more generally, hypermedia) document elements. When a user utilizes a cursor control device to select and "click" on a hypermedia item in one document, a related document will automatically be accessed as identified by that link. For example, FIG. 2 illustrates a simple example of a popular Web document known as a "home page". The home page is the main page of a Web site. A Web site is comprised of several Web pages. For example, the Web pages 602, 604, 606, and 608 in FIGS. 6$a$–$d$ are the pages that form the Web site. The main page 602 is the home page of the Web site. In FIG. 2, another example of a home page 40 includes title 42, graphic image 44, instructional text 48, and list of bullet items 46$a$–$c$. Selections 46$a$–$c$ are each hypertext. A Web hypermedia item is actually encoded with a Uniform Resource Locator (URL) tag, which literally addresses a document located on a remote network server. If a client of a Web server is equipped with suitable "browser" software, then a user of that client can point and click on any one of the hypermedia items within home page 40, and an http request to view the associated, linked content residing elsewhere on the Internet will automatically be generated and dispatched by the client's server to the appropriate Internet server which "hosts" the linked document. The linked material will then automatically be retrieved and ultimately displayed on the client. Http further includes the Hyper-text markup language (html), which may be used to specify a certain layout structure for Web documents, e.g., specifying subsections of the document as a title, image, list, etc. Html specifications are interpreted by a client's browser, resulting in an appropriate display on the particular client's computer platform.

FIG. 3 provides a broad outline of a prior art client-server architecture, for use in the context of a WAN such as that illustrated in FIG. 1. User's client machine 20$d$ preferably includes digital computer facilities including CPU 68, user I/O peripherals 66, and storage device 64 (including internal and external memory) for storing operating system 62 and client software 60. WAN server 10$d$, preferably coupled to client 20$d$ through a high-speed local connection, is equipped with digital computer facilities analogous to those of client 20$d$, and also with server software 50. The server 10$d$ constitutes what is known in the art as a service provider.

A user can access a search engine's web site by using the browser software. A search engine is a service that compiles a list of target documents (Web pages, but not necessarily a home page), in the form of hypertext links, that correspond to an user query. These search engines have recently turned into portals. A portal is an Internet Web site that not only offers the user the capability to perform a search, but that attempts to satisfy all of the needs of the user by integrating other services into their site. FIG. 4$a$ shows an example of a portal site displaying the search results for a query of "cheap airfare". Portals are in fact second generation services, and are essentially a refinement of Web search engine services.

One of the most important aspects of the explosive growth of the Web is the potential for electronic commerce that the Web offers. The novelty of the medium and the ease of access not only lead to interesting market structures, but to different ways of searching for services and interacting with consumers. Over the past four to five years we have seen the appearance of several important Web services for electronic commerce, of which a relatively new instance is the portal site. Examples of portal sites are Yahoo, Excite, and Lycos. Portals attempt to act as a starting point for the users on the Web, exposing the users to advertisement information from sponsors of the portal site. This leads users of the portal to electronic commerce activities, such as travel and consumer electronics.

The business model of portal services consists of two parts. The first one is to have the consumer buy goods directly from the portal or through a partner site. The other strategy involves satisfying the user's information needs locally and in the process present advertising banners that result in revenues to the portal. The mechanics of this approach are relatively simple. Users enter a portal site, search for information, see advertisement information, and then usually leave.

While this model seems to have worked for various companies, it is highly paradoxical in the sense that it confronts the portal with a dilemma. On the one hand, the service strives to generate better and faster results for the users. If the results are presented at the entry point, however, leading users to another site, there is an opportunity cost for the provider. The user never travels deeply into the site, thus missing the advertising and consumer goods that he or she potentially could buy. To solve this dilemma, some search services (e.g., Lycos) have implemented mechanisms that work to prevent users from leaving for other search services (e.g., Excite). When a user of the first service searches for the name of the second service, the first service displays results that attempt to dissuade the user from leaving the first service site by presenting a link back to the first service's search page.

A recent solution to the dilemma resorts to the notion of "stickiness", whereby the provider attempts to keep consumers at their site by displaying potentially attractive links that only point into their site. This is much in line with standard marketing practices in the commercial world.

To solve this problem we present an alternative approach to the stickiness solution. In order to solve this dilemma, this approach exploits the fact that, given different needs for information goods (a user requesting information from different categories), users of the Web are willing to spend additional time for acquiring the information goods while surfing the Web, before their need for information is satisfied. The approach is referred hereto as time discrimination, because it is a variant of a technique known in economics as price discrimination. In this invention, instead of blocking surfing paths, the depth to which users surf when accessing an electronic commerce provider is increased.

SUMMARY OF THE INVENTION

Accordingly, it is an object of the present invention to meet the foregoing needs by providing systems and methods that provide time discrimination in the World Wide Web.

Specifically, a method for meeting the foregoing needs is disclosed. The method creates a computational model of users of the World Wide Web that represents aggregate World Wide Web surfing patterns; uses the computational model to determine a first number of clicks that a user goes through in a specific type of query entered by the user in a conventional web search engine; uses the computational model to determine a second number of clicks that the user goes through in the specific type of query entered by the user in an optimized web search engine; and subtracts the first number of clicks from the second number of clicks to extract the gain obtained by time discrimination. Further, two mechanisms that facilitate the exploitation of the gain obtained by time discrimination are disclosed. These mechanisms respectively involve the techniques, disclosed herewith, of dynamic reconfiguration of Web links, and of versioning information goods.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIGS. 6a–6d illustrate a sequence of pages in a Web site surfed by an user;

DETAILED DESCRIPTION

Figure 1:
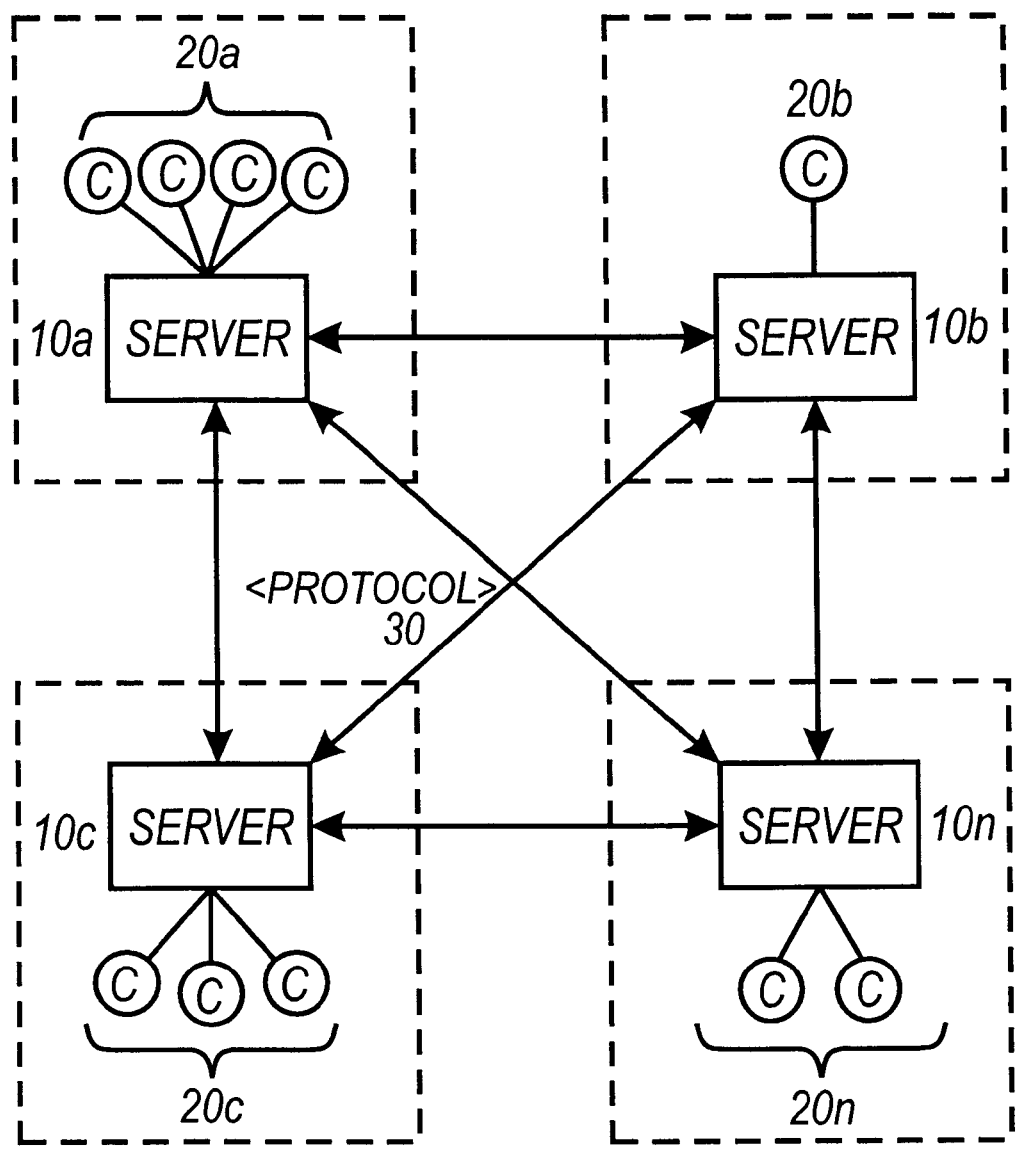
FIG. 1 illustrates a basic, high-level architecture for a typical client-server WAN such as the Internet or the World Wide Web.
Figure 2:
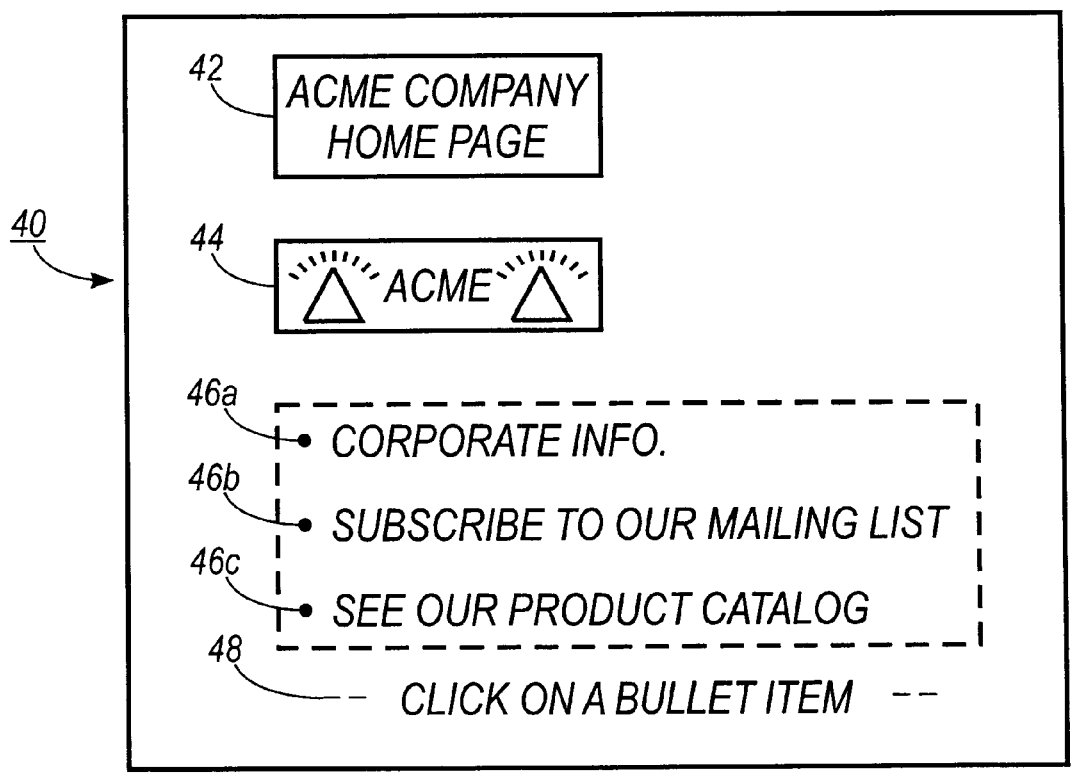
FIG. 2 illustrates a single example of a typical "home page" document on the World Wide Web.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention perform time discrimination in the World Wide Web. For purposes of the following description, the systems and methods consistent with the present invention are only described with respect to user surfing patterns predicted by the law of surfing or by experimental results. The description should also be understood to apply in the cases where the aggregate surfing patterns of users are predicted by other methods.

In the present application, we establish the willingness of users to spend additional time for obtaining an information good (consumer willingness) in the Web by examining the paths of over five hundred thousand unique visitors to two popular Web services. This is done by exploiting the fact that surfing patterns are extremely regular and described by a universal law. The consumer willingness in the Web manifests itself in noticeable shifts in the surfing patterns of users when accessing different kinds of information goods or services. After establishing the existence of consumer willingness in the Web, we present two methods for performing time discrimination, namely, by dynamically configuring Web sites (including home pages) and by versioning information services (portals).

Figure 7:
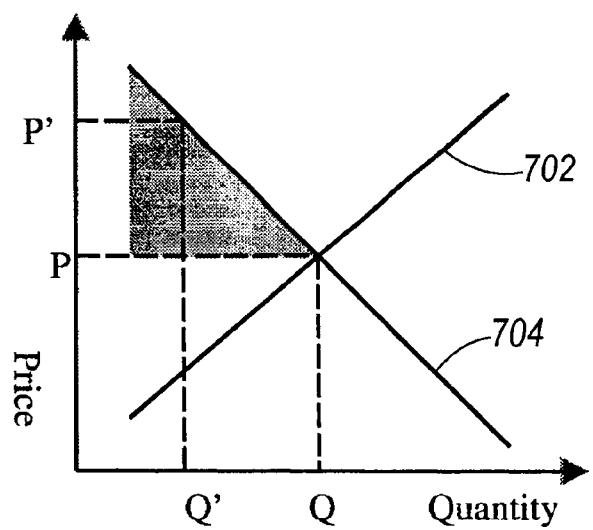
FIG. 7 shows the Supply/Demand curve showing consumer surplus.

It is a well known fact that markets set prices by constructing supply-demand curves that contain information about a given market's condition. A typical curve, illustrated in FIG. 7, depicts the optimum price point P, at the intersection of the demand curve 704 and the supply curve 702. While prices are usually set at this intersection (P, Q), suppliers can also use multiple price points in order to increase revenues. This technique is known as price discrimination. Specifically, the area represented by the shadowed area (triangle) is the amount of money a producer could have extracted from the consumer had it performed price discrimination (posted more than one price for the same good, but of different quality). This area is know as the consumer surplus. For example, if the producer chose the quantity Q', there would have been some consumers willing to pay a price P' which is greater than P. Notice that if there is a unique price point, the producer would loose P'–P.

In the context of the Web we concentrate on a variant to this scheme which relies on the number of clicks that a consumer performs at a given site and thus defines the consumer surplus in the time domain. In the Web context, the price that a consumer pays would be the surfing time spent by a user of the Web (or number of clicks) while searching for an information good. The product is the same (information), as in the price discrimination context. The "quality" of the good, however, is expressed in the Web context as the information category.

Because in the present invention the demand curve alone is calculated for a given information good, the use of the term consumer surplus is a misnomer. Consumer surplus is measured when both the demand and supply curves are available. Instead of using the term consumer surplus, the term "gain obtained by time discrimination" is used. This gain is based on the presumption that Web sites have a constant quality of service T (see FIG. 8). As will be explained below, the quality of an information retrieval system can be measured in terms of a recall/precision curve.

Figure 8:
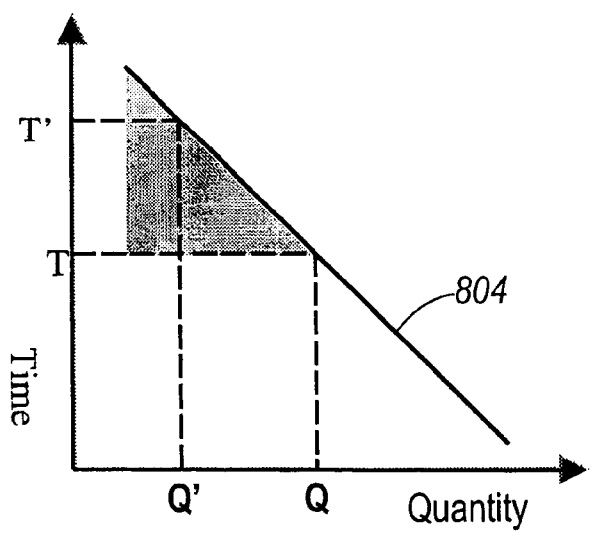
FIG. 8 shows the temporal Demand curve showing time differentiation.

FIG. 8 shows a temporal domain demand curve 804. In this temporal domain, the focus of attention economics, markets can set prices by constructing a similar curve to the supply and demand curves, with time replacing price and acting as a proxy for the number of clicks that a given consumer goes through at a given provider's site.

FIG. 8 depicts the amount of time a user is willing to spend for a given service need. Notice that one could have the equivalent of price discrimination by versioning the goods, i.e. creating several variants of the same good targeted at different consumers. This allows us to identify the shadowed area as the gain obtained by performing time discrimination in the temporal domain.

Consumers of electronic commerce expect to find what they are looking for at some predictable rate, T. And yet, this rate might depend on both the domain that they surf and demographics of the user population. If providers only attempt to satisfy consumer need at a set T, they are, in effect, setting a single quality of service. For search engines (portals), this amounts to setting a constant precision/recall curve.

Figure 13:
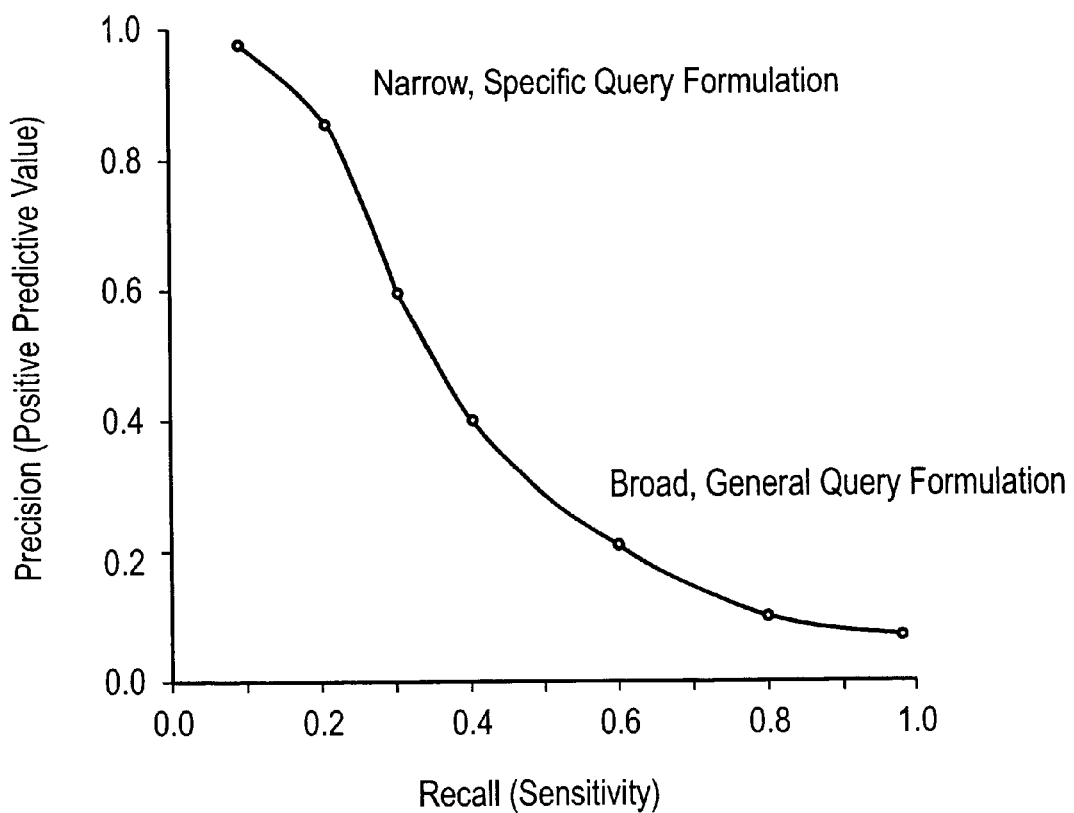
FIG. 13 shows an average recall/precision curve.

A typical precision/recall curve is shown in FIG. 13. The quality of information retrieval systems can be measured in terms of the precision of the information retrieval, and the recall of the information retrieval. The recall ratio reflects a finding of all relevant items, and is defined as the number of relevant items retrieved divided by the number of relevant items in a database. The precision ratio relates to the goal of not retrieving irrelevant documents, and is defined as the number of relevant items retrieved, divided by the number of items retrieved (relevant and non-relevant).

For a large number of queries, the average performance of a retrieval system will follow the curve of FIG. 13. These two ratios, as seen from the graph, have an inverse relationship. Each point in the curve is the precision/recall score for a given test (query or request of information).

While the notion of consumer willingness in the temporal domain is attractive in the context of electronic commerce in the Web, it needs to be validated by experimental data. This implies determining whether or not consumers do click further as a function of the domain they are visiting and their demographic characteristics.

Figure 9:
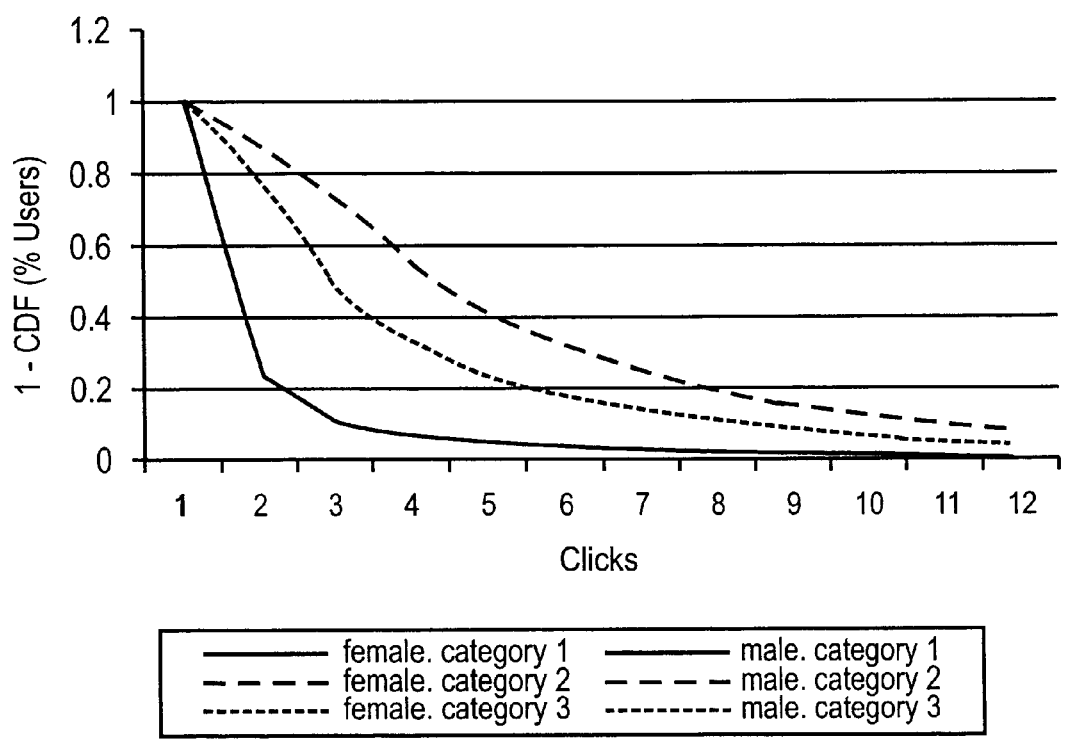
FIG. 9 shows a graph describing the surfing patterns of users of a first commercial portal for three categories separated by gender.

FIG. 9 shows a graph describing the surfing patterns of Yahoo users for three categories separated by gender. The Yahoo data consisted of anonymous usage logs collected during an eleven day period. Usage logs refer to information about users, including the number of users, who visit a Web page. The data was filtered for requests only within Yahoo's directory service (as opposed to financial news, weather, etc.). The resulting data set contained over five million impressions, or page views, generated by over five hundred thousand unique visitors.

In order to test these ideas, user logs of two Internet Web services were analyzed, namely, Excite and Yahoo. The measured cumulative distribution function (CDF) of the depth L is shown in FIG. 9., where 1-CDF (percentage of users) is plotted as a function of depth of surfing, L, for three top level categories in the Yahoo site, and genders. FIGS. 6a–d serve as an example that illustrates the concept of depth of surfing L. If a user visited all of the Web pages illustrated in FIGS. 6a–d, the value of L would be 4.

FIG. 9 was obtained by fixing the length L and measuring how many users reached that level. The difference between any two depths, L and L' reflects the stop rate, i.e. the number of people, in terms of percentage, that stop surfing at the first depth L.

As the measurements show, there is a marked difference in the typical depth to which users surf depending on the category, while only a slight difference was detected among surfers of different gender. Moreover, the tails of the distributions for each category are markedly different, which implies that certain categories are surfed deeper than others.

As to the slight gender differences observed, they seem to be due to the fact that the data has been aggregated at the top level category, thus being unable to finely discriminate between gender. Had a finer resolution been available, as for example between fast cars and cosmetics, a gender difference in surfing patterns would have been noticed. Alternatively, the slight differences might be caused due to the structure of the Web site. That is, depending on the Web site, surfers at some point reach the end of the Web site (no further links to follow) before satisfying their information needs, and thus no differences in gender are observed.

Another experimental test of a shift in the maximum of the surfing curves was provided by an analysis of surfing data from Excite that discriminated between adult and non-adult type sites. In 1997 Excite provided the research community with a small, anonymous usage log, containing over fifty thousand pages views from over ten thousand unique visitors. Each entry provides an indication that the user viewed a single result page containing, by default, ten matches. Two entries in the log for the same search by the same user indicates that the user viewed twenty results.

Figure 10:
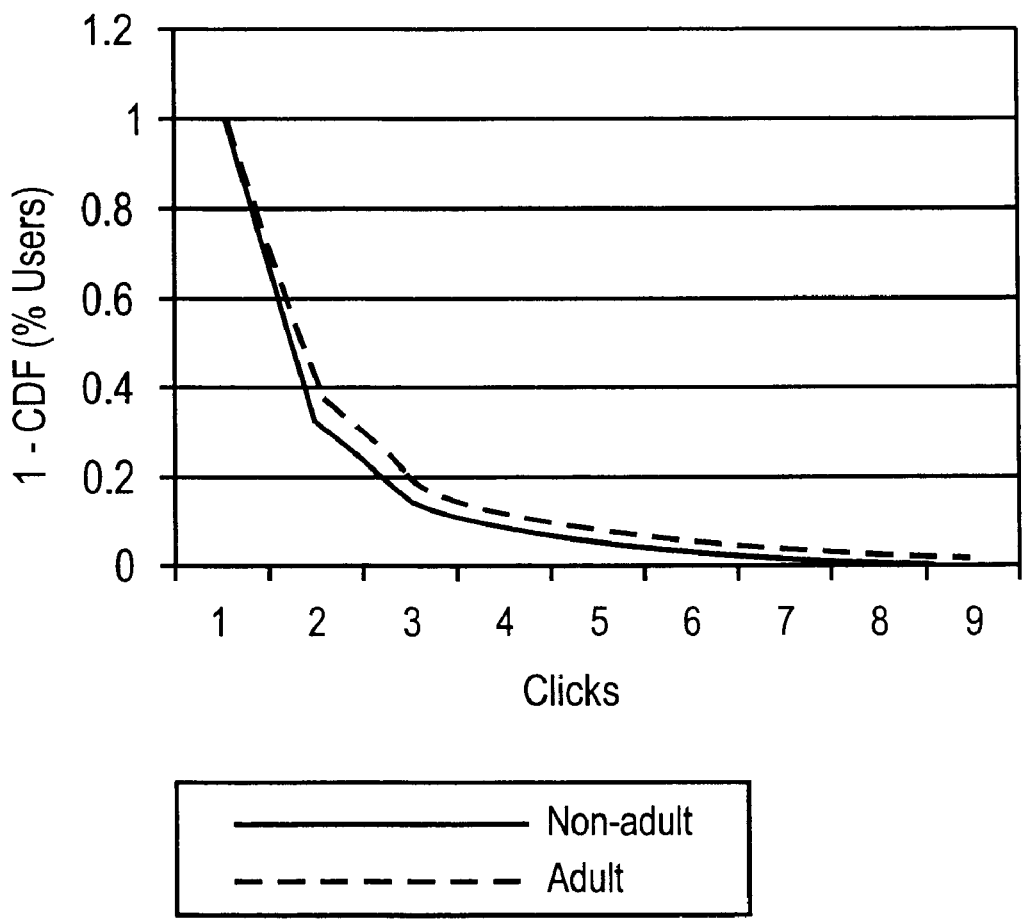
FIG. 10 shows a graph of surfing patterns of users of a second commercial portal, separated into adult and non-adult categories.

The results of the Excite test are shown in FIG. 10, where the quantity 1-CDF is plotted as a function of surfing depth, L, for adult and non-adult sites. Discrimination was obtained by devising a filter for the search queries that separated any explicitly sexual query from the rest. As can be seen from FIG. 10, there is a noticeable difference in surfing patterns. Since the shift in the typical number of clicks corresponds to a different value of T, i.e. the typical time cost for users surfing a site, this second test also confirms the existence of a consumer's willingness to spend additional time looking for information, when the category of information varies.

Therefore, it is proper to establish an analogy between a willingness of consumer to spend additional money in a product of better quality, and the willingness of a Web user to spend additional time in a Web site when searching for information goods of different categories.

Having determined the existence of consumer willingness in the Web, it is natural to ask for strategies that would allow producers to exploit that characteristic. What is needed consists of mechanisms that play the role of price discrimination in the temporal domain. We refer to those mechanisms as time discrimination mechanisms.

We disclose two specific strategies that implement time discrimination. The first one is a general procedure that works with any commercial web site, whereas the second is ideally suited for information providers, such as search engines and shopping directories.

The first technique is called dynamic reconfiguration of Web links. One can construct a Web site that changes dynamically based on what is known about the user.

Figure 11A:
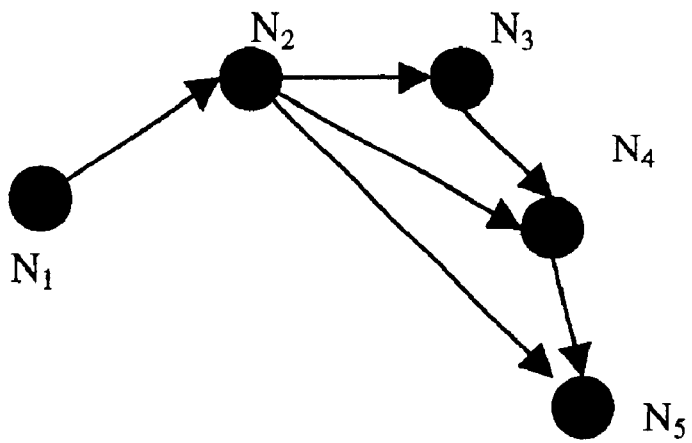
FIG. 11a shows a directed sub-graph for a Web site with various nodes connected by various directed links.
Figure 11B:
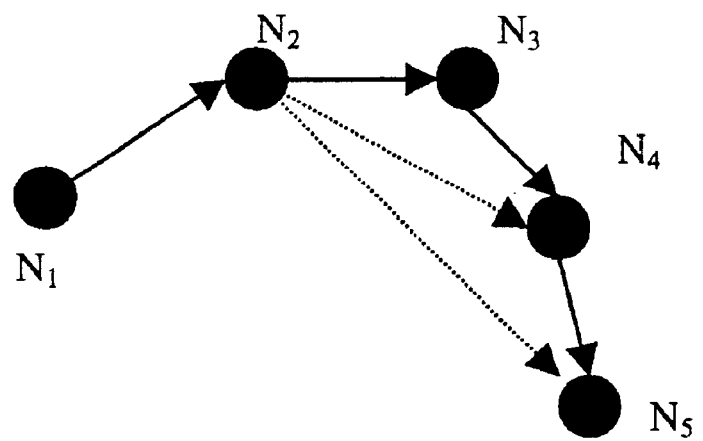
FIG. 11b shows a directed sub-graph for a Web site with various nodes connected by various directed links, with two of the direct links being capable of being switched on or off.

This is achieved by changing the link structure of a site to lengthen the path that a given user follows, thereby providing time discrimination to exploit the consumer willingness. The gain obtained by time discrimination is the number of additional paths that the user would have to go through in order to get to the desired document (target document). This gain translates into monetary gains for the web site that advertises information from sponsors. For example, if there is a quick route to a given page, one may wish to turn that route off if the user is likely to visit more pages in between. An example of this dynamic organization is described in FIGS. 11a and 11b.

Notice that a user entering node N1 only has the choice of entering node N2 or leaving the site. At node N2, a user has three choices. If one can predict with some degree of certainty (based on the user's behavior) that the user's trajectory is node N4 or N5, and there is a user willingness to continue further, then the direct links from nodes N2 to N4 and N5 can be removed. The user's behavior can be predicted by using statistically derived confidence levels. These levels are produced by a computational model of the user that determines how many intermediate nodes a user is willing to go through in order to arrive at her or his eventual goal. Those confidence levels could also be derived from a user profile that is created by monitoring a particular user's surfing patterns. Moreover, the law of surfing, discussed below, could also be used to predict the user's surfing patterns.

An example of this first technique is shown in FIGS. 6a–d. FIGS. 6a–6d correspond to nodes N2–N5 in FIGS. 11a and 11b, respectively. If based on the confidence levels, it has been determined that the user would be willing to surf through pages 604 and 606 in order to get to the desired page 608, the owner of the Web site would have to edit pages 604 and 606 in order to remove links from each of those pages that allow the user to directly access page 608.

Figure 5A:
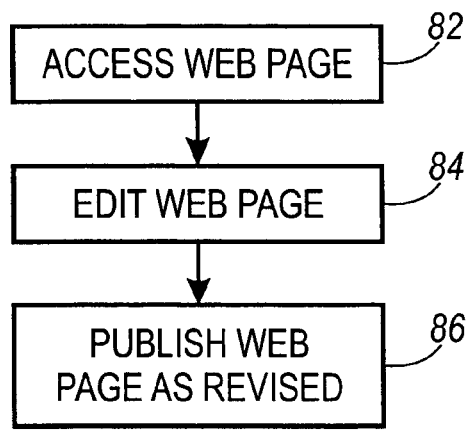
FIG. 5a illustrates a flow diagram for a scenario in which a single Web page is edited.

FIG. 5a shows the steps necessary to edit a target document (e.g., A web page 604). First, the Web site owner would have to access the Web page 82, which resides in the service provider's memory 54. The owner makes changes to the Web page 84 that include the addition and deletion of links. Finally, the owner publishes (or makes the Web page available to other users of the Web) the revised document 86. A person of ordinary skill would recognize that the owner makes these changes to his or her Web page, by accessing the web site of the service provider, logging in as a registered Web site owner, and "manually" making the desired changes. In the present invention, these link changes could take place automatically by modifying the Web page editing software to use information from the predicted confidence levels to modify the Web site without the Web site owner's intervention.

The second technique for providing time discrimination is called versioning information goods. This technique is based on the existence of the law of surfing, which is a computational model that predicts how far people will click through sites based on the relevance of the information presented. In other words, the law of surfing determines the number of users that will surf for a given depth within a site.

The law of surfing was derived by scientists in the Xerox Palo Alto Research Center (PARC). All of the documentation related to the law of surfing that is publicly available is incorporated herein by reference.

Figure 12:
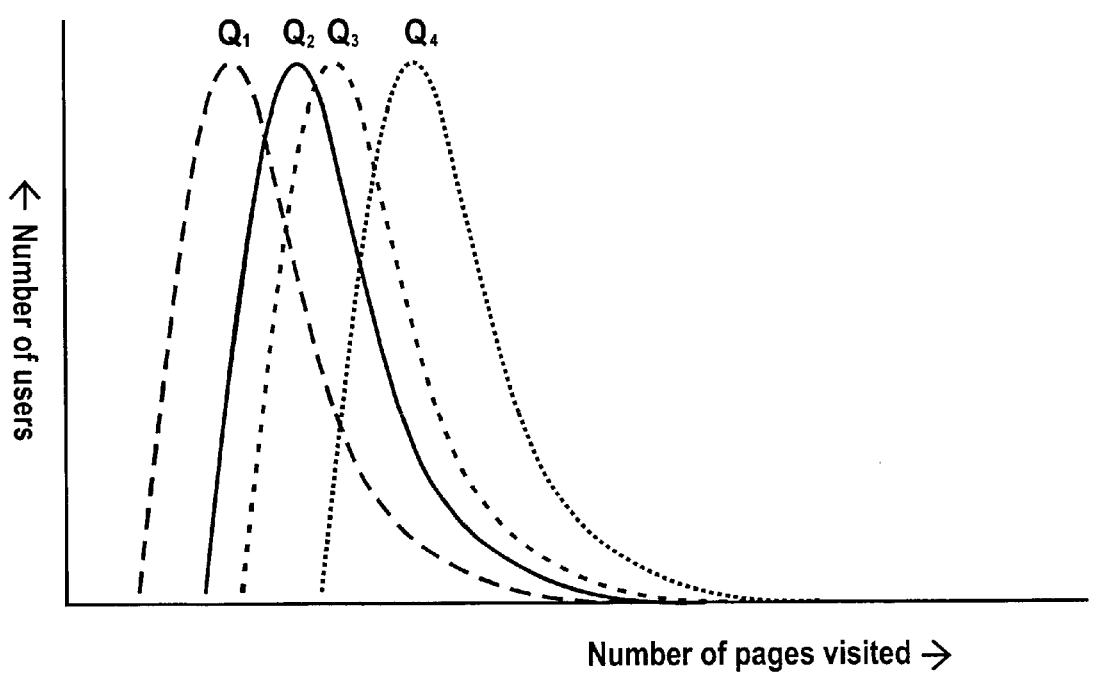
FIG. 12 shows a graph of an approximation of user behavior given by the law of surfing.

The basic scheme consists in collecting surfing data for each site for a fixed level of versioning or quality of service. For a search engine this means a set precision/recall, and it will lead to surfing curves shown schematically in FIG. 12. The solid line Q2 represents an approximation of known user behavior given by the law of surfing. Each curve corresponds to a different kind of query. A Web site (or portal) that always performs with a constant quality of service does not take advantage of the willingness of various users to continue surfing. When these surfing distributions are expressed in terms of one minus their cumulative distributions, they are consistent with the data shown in FIGS. 9 and 10. Thus the typical number of links a user will surf determines when to provide the good quality information (users will most likely stop surfing once the high quality information appears on the screen) or the incentives to go to other pages.

In order to exploit the consumer willingness to continue surfing, as indicated by the shifted maxima in the curves, one can offer a second version of the search service with different quality characteristics. This new version can be integrated into the service along with decision rules—trained by the usage logs or user profile as mentioned above that decide which version should be offered to the user. Thus, users can now continue to surf along this new version of the search engine or portal, and therefore spend more time in a given provider's site.

Figure 4A:
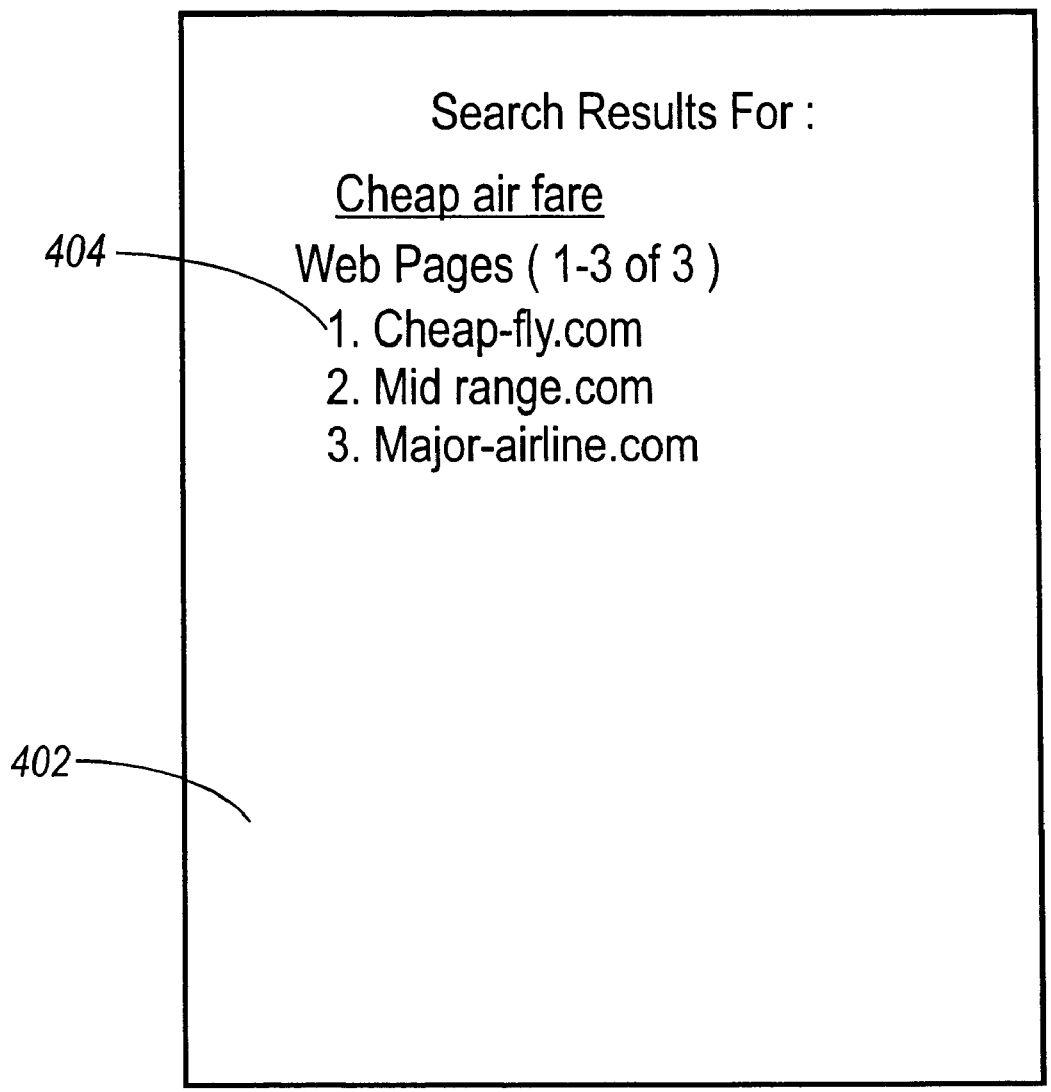
FIG. 4a illustrates an example of a conventional Web search engine or portal.
Figure 4B:
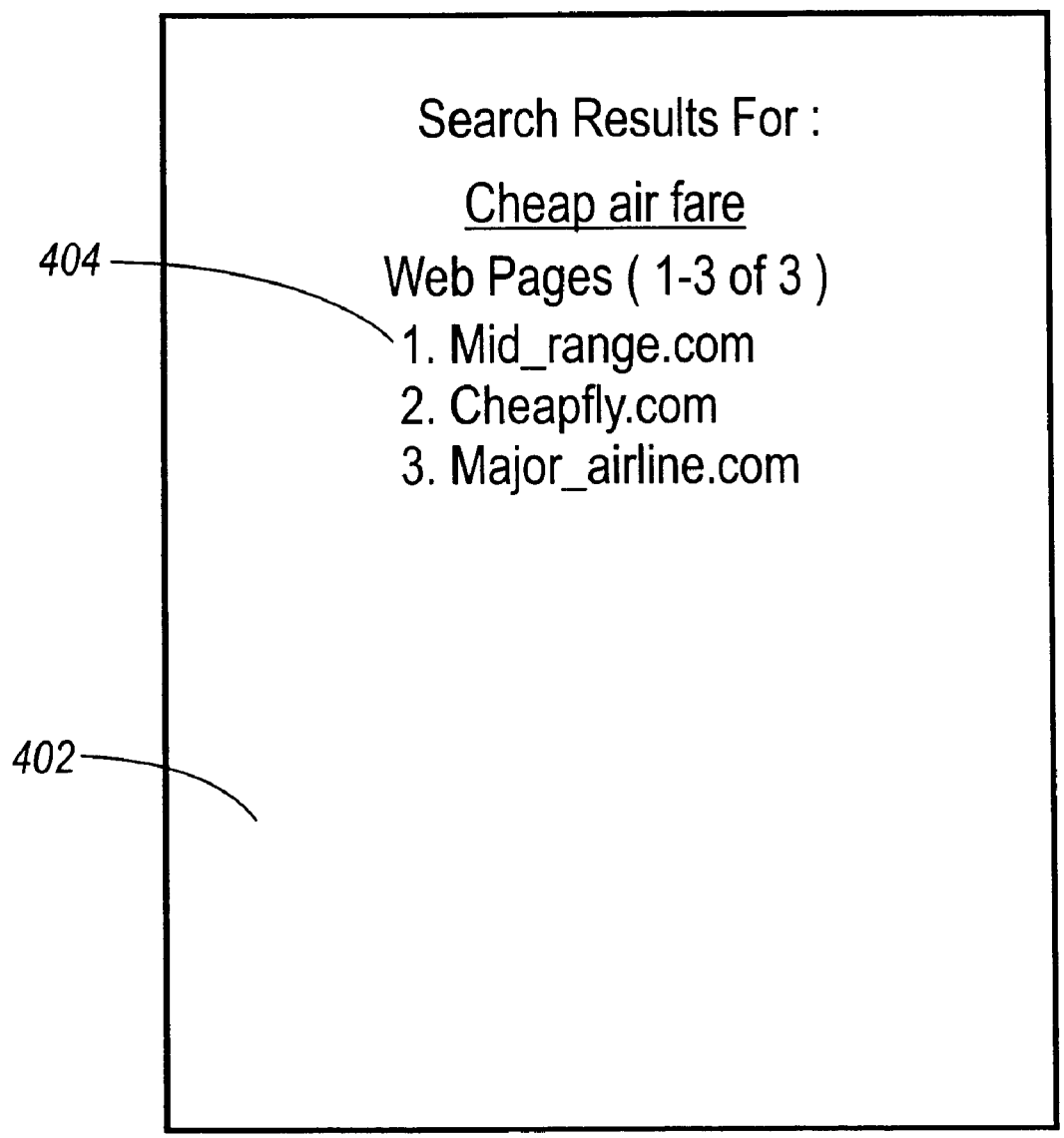
FIG. 4b illustrates an example of an optimized Web search engine or portal.

FIG. 4a shows a Web page 402 of a first version of a portal that contains a list of links 404 relevant to the surfer's query. These links are sorted in order of relevance, that is, the first link is likely to contain the highest quality information. FIG. 4b shows a Web page 404 that is produced by a second version of a portal, having a quality that is less than that of the first version. The lesser quality is evidenced by examining the order of the links 404, whereby the link offering the best bargains would appear in second place, while the middle range fares would appear on the first place.

Figure 5B:
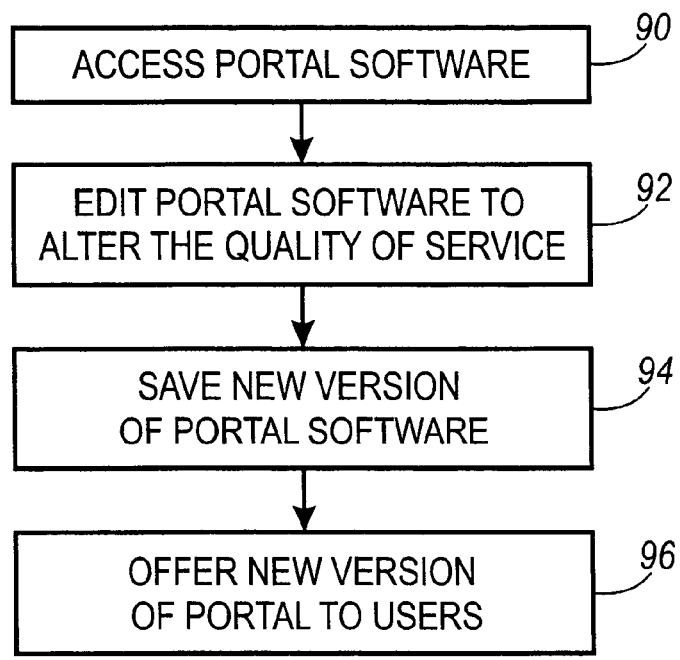
FIG. 5b illustrates a flow diagram for a scenario in which portal software is edited and a second version of the portal is offered to the users.
Figure 6A:
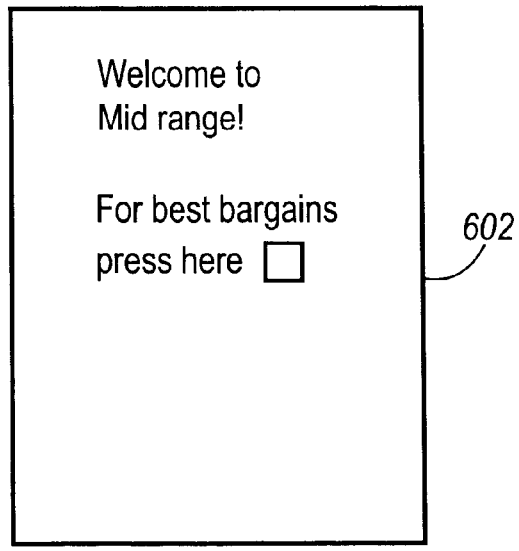
Figure 6B:
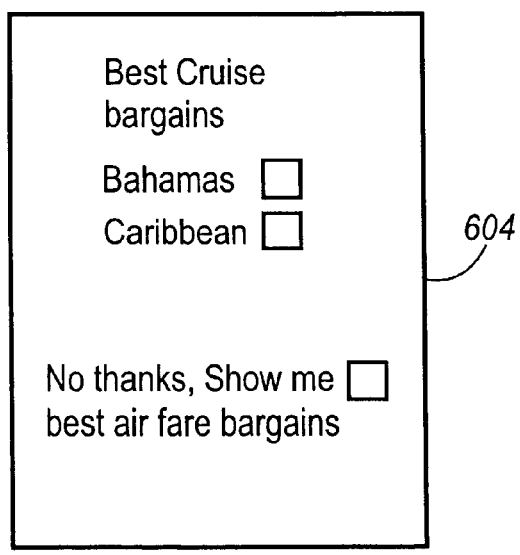

In order to form the second version, the portal's software would have to be modified. FIG. 5b shows the steps necessary to make changes to portal software, specifically, to the manner in which the operator of the portal software changes the quality of service (order of presentation of high quality information to an user) corresponding to an user's query. To alter the way in which a portal performs a search, and the order of the links displayed as the search results, the client software 60 would need to be changed. In this case the client is the operator of the portal.

The first step is to access the portal software 90 and gain access to the portal's routine that performs information retrieval. In step 92 the search algorithm is edited so as to alter the quality of service of the portal. This information retrieval routine could be based on statistical language processing techniques such as the ones provided in the Xerox Lexical Technology package that is commercially available from the Xerox Corporation.

Figure 3:
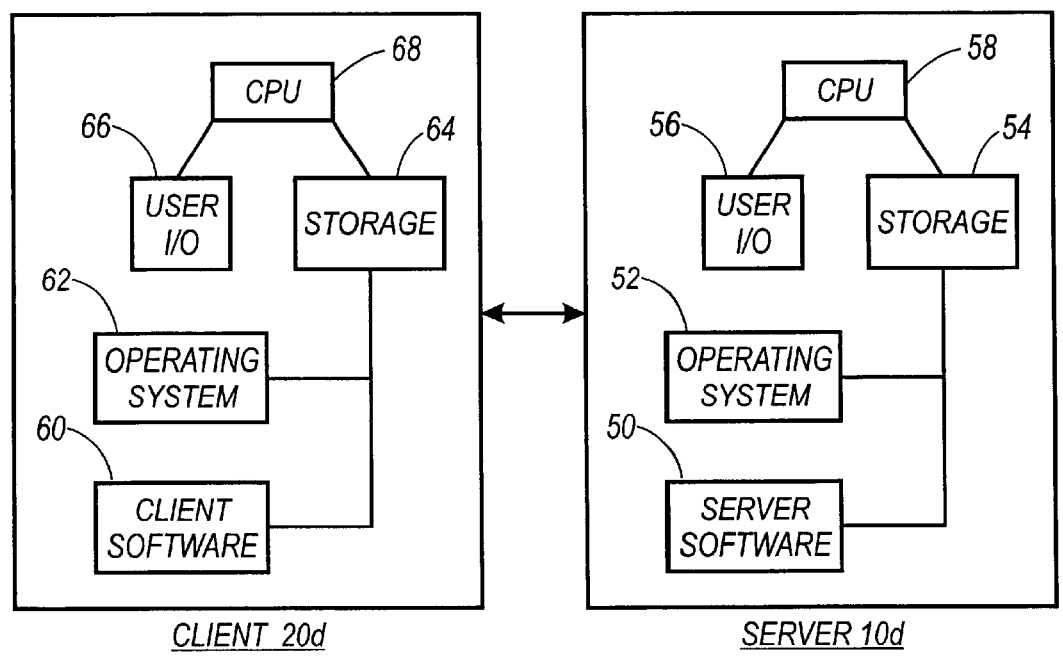
FIG. 3 broadly outlines a client-server architecture.

In step 94 the new version of the portal is saved in the client's system memory (numeral 64 in FIG. 3). Finally, the new version of the portal is offered for use by Web surfers.

Advertisers can advantageously combine the use of modified Web software, incorporating the two methods discussed above for providing time-discrimination in the Web, and the use of several mechanisms for optimal placement of advertisement information in the Web. One such mechanism borrows from the marketing technique of "seductive moment". In essence, the technique presents an advertisement banner at the point where the information needs of the user are satisfied. An example of such point in the dynamic configuration method of FIG. 11*b* could possibly be node N4. An example of such point in the versioning example of FIG. 4*b* could possibly be item number 2 on the search results displayed on the Web page 404. 1t is at this point where a user is more likely to notice the advertisement and therefore continue to surf the site.

The determination of the place in a Web site where the advertisement information is to be displayed can be made by using the curves described above, since they facilitate the accurate prediction of where the seduction points are located. Further, advertisement space for presenting advertisement information at the seductive points can be sold to advertisers at a premium rate, as click through rates (the percentage of people clicking on an advertisement banner) will likely increase.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A method for providing time discrimination in the World Wide Web comprising:
    creating a computational model of users of the World Wide Web that represents aggregate World Wide Web surfing patterns;
    using the computational model to determine a first number of clicks that an user goes through in a specific type of query entered by the user in a conventional portal;
    using the computational model to determine a second number of clicks that the user goes through in the specific type of query entered by the user in an optimized portal;
    subtracting the first number of clicks from the second number of clicks to determine a time gain obtained by providing time discrimination in the form of an optimized portal.

2. The method of claim 1, wherein the computational model implements the law of surfing.

3. The method of claim 1, wherein an optimized portal presents high quality information deeper into a Web site when compared to a conventional portal.

4. The method of claim 3, wherein advertisement information is displayed to an user of the optimized portal at a point where the information needs of the user are predicted to be satisfied, the prediction being based on the computational model of users of the World Wide Web.

5. A method for providing time discrimination in the World Wide Web comprising:
    creating a computational model of users of the World Wide Web that represents aggregate World Wide Web surfing patterns;
    using the computational model to determine a first number of clicks that an user goes through before reaching a target Web page in a Web site offering a plurality of link paths that lead to the target Web page;
    using the computational model to determine a second number of clicks that the user goes through before reaching the target Web page in the Web site, the Web site being reconfigured to offer an optimized link path that leads to the target Web page;
    subtracting the first number of clicks from the second number of clicks to determine a time gain obtained by providing time discrimination in the form of a reconfigured Web site.

6. The method of claim 5, wherein the computational model implements the law of surfing.

7. The method of claim 5, wherein the Web site is reconfigured by:
    using the computational model for determining an intermediate Web page that users surf through in order to access the target Web page, the intermediate Web page being between an initial Web page from which users start surfing the Web site and a Web page containing the target Web page; and
    deleting all the shortcut links between the initial Web page and the intermediate Web page.

8. The method of claim 7, wherein advertisement information is displayed to an user of the reconfigured Web site at a point where the information needs of the user are predicted to be satisfied, the prediction being based on the computational model of users of the World Wide Web.

9. A method for providing time discrimination in the World Wide Web comprising:
    creating a first computational model of users of the World Wide Web that represents aggregate World Wide Web surfing patterns;
    deriving a first distribution from the first computational model, the distribution representing the number of users surfing the Web as a function of the number of links a user will surf for all queries;
    creating a second computational model of users of the World Wide Web that represents World Wide Web surfing patterns for a specific type of query;
    deriving a second distribution from the second computational model, the distribution representing the number of users surfing the Web as a function of the number of links a user will surf for a specific type of query;
    calculating a subtraction of the number of links corresponding to the maxima of the second distribution from the number of links corresponding to the maxima of the first distribution; and
    offering the user of the Web a second version of a portal through which an user enters the queries, the second version having a second quality that depends on the subtraction calculation.

10. The method of claim 9, wherein the computational model implements the law of surfing.

11. The method of claim 9, wherein the quality of the second version will remain the same as the quality of a first version if the computation results in a negative number.

12. The method of claim 11, where in the quality of the second version will be lower than the quality of the first version if the computation results in a positive number.

13. The method of claim 12, wherein a lesser quality means that high quality information is offered to the user deeper in the results for a query search displayed by the portal.

14. The method of claim 13, wherein advertisement information is displayed to an user of the second version of a portal at a point where the information needs of the user are predicted to be satisfied, the prediction being based on the first computational model of users of the World Wide Web.

15. A method for providing time discrimination in the World Wide Web comprising:

creating a computational model of users of the World Wide Web that represents World Wide Web surfing patterns on a web site;

using the computational model to predict the number of users that will go from a first point in the Web site to a second point in that Web site;

using the prediction to delete all the shortcut links in the Web site between the first point and the second point, including shortcuts from links in between first and second points that provide a shortcut path to the second point.

16. The method of claim 15, wherein the Web site keeps an user profile of the user accessing the Web site.

17. The method of claim 16, wherein a version of the Web site with the deleted links is offered to the user if it is determined, by using the user profile, that the user will likely go to point B in the Web site.

18. The method of claim 17, wherein advertisement information is displayed to an user of the deleted links version of the Web site at a point where the information needs of the user are predicted to be satisfied, the prediction being based on the computational model of users of the World Wide Web.

19. The method of claim 15, wherein advertisement information is displayed to an user of the Web site at a point where the information needs of the user are predicted to be satisfied, the prediction being based on the computational model of users of the World Wide Web.

\* \* \* \* \*